Patented Oct. 24, 1933

1,931,673

UNITED STATES PATENT OFFICE 1,931,673

METHOD OF TREATING LATEX AND PRODUCT PRODUCED THEREBY

Alexander A. Nikitin, Passaic, N. J., assignor to The Naugatuck Chemical Company, Naugatuck, Conn., a corporation of Connecticut No Drawing. Application December 2, 1931
Serial No. 578,617

5 Claims. (Cl. 18—50)

This invention relates to methods of treating latex and the products produced thereby.

The invention more particularly relates to the treatment of latex with milk in order to enhance the various properties of the rubber dispersion.

By the addition of milk to latex, I found that I may obtain greatly increased mechanical and colloidal stability of the latex composition. I may prevent "webbing" by which term is meant the formation of a film between the curved sides of a solid object as it is removed, after dipping, from a latex composition. For example, a glove form, if removed from some latex compositions, forms a web between the fingers which produces an undesirable effect on the dried rubber product recovered from the adhering latex composition. With the process of this invention, this "webbing" is greatly reduced and in some cases entirely eliminated. The addition of milk to latex greatly changes the viscosity of the latex and thickens latices of various concentrations, even up to paste-like consistencies. I have found that milk can be used, if desired, to prevent the creaming of latex in the presence of the usual type of creaming agent. It greatly reduces, and in many cases prevents the forming of latex. The addition of milk protects latex against coagulation by heat and allows the latex thus to be concentrated more readily by either vacuum or direct heat operations. It raises the surface tension of the liquid which is a highly desirable property for many uses. Another great advantage which, of course, follows somewhat from the increased colloidal stability imparted to the latex by the addition of milk, is that the presence of milk permits ordinary latex to be acidified by strong acids. In this way, the milk may be considered as a new type of stabilizer for acid latex and furthermore it enables latex to be acidified without dilution. A great advantage of using milk and milk products in latex is that they may be mixed in all proportions with latex without danger of coagulation.

In carrying out the invention, I introduce into the various forms of latex, milk or milk products, such as cow's sweet milk, skimmed milk, cream, buttermilk, evaporated or condensed milk, whole dried milk, and the like. In the specification and claims the term "milk" is to be construed broadly to mean the milk of mammals and the various milk products produced therefrom, such as are described immediately above. Various forms of latex, such as normal ammonia preserved, concentrated, evaporated, centrifuged, creamed and the like, may all be improved by the method of this invention. In most cases, the milk may be added directly to the latex without complicated preliminary treatment. Powdered milk should preferably first be dissolved in water and then this solution, colloidal in nature, added to the latex. The milk may be added to the latex in any desired amount since the two substances, as has been stated, are miscible in all proportions. I have found, however, that for practical purposes the milk is preferably added in minor proportions.

The following examples showing the various improved results obtained by the process of this invention are included merely as illustrations and are not intended to be considered in any way as limitations of the invention.

*Example 1*

The following table clearly shows the improvements in the mechanical stability of normal latex produced by the addition of milk. Various milk products in the proportion shown in the table were added to normal latex and measurements of the stability taken.

|  | Stability at 30% solids |
|---|---|
|  | Minutes |
| Normal latex | 22 |
| Normal latex 100+sweet milk 3 cc | 59 |
| Normal latex 100+sweet milk 6 cc | 69 |
| Normal latex 100+sour milk 3 cc | 57 |
| Normal latex 100+sour milk 6 cc | 66 |
| Normal latex 100+dried milk 10% 3.5 cc | 26 |
| Normal latex 100+dried milk 10% 7 cc | 32 |
| Normal latex 100+dried milk 10% 10.5 cc | 39 |
| Normal latex 100+ evaporated milk (25%) 1.5 cc | 39 |
| Normal latex 100+evaporated milk (25%) 3.0 cc | 45 |

*Example 2*

The effect of the addition of milk on the mechanical stability of creamed latex in the presence of zinc oxide is clearly shown in the following table wherein creamed latex (60% total solids, .45% ammonia) was treated with two parts of zinc oxide to 100 parts of latex (solids) and to this milk products in the various amounts shown were added.

|  | cc. of milk per 100 grams latex | Mechanical stability at 30% solids |
|---|---|---|
|  |  | Minutes |
| Latex | 0 | 1.5 |
| Latex+sweet milk | 5 | 15 |
| Latex+sweet milk | 8 | 18 |
| Latex+sour milk | 8 | 18 |
| Latex+powdered milk (5% solution) | 6 | 6 |
| Latex+powdered milk (5% solution) | 10 | 8 |
| Latex+dried milk (5% solution) | 6 | 7.5 |
| Latex+dried milk (5% solution) | 10 | 9 |
| Latex+evaporated milk (25% total solids) | 4 | 15 |

*Example 3*

To 100 grams of a once creamed latex, having a concentration of 60% solids, 1.5 ccs. of ordinary cow's milk were added. The resultant product was considerably thicker than the original latex, having a viscosity of 122 seconds, as compared with 9 seconds for the creamed latex without the milk. It also had a higher surface tension, did not web, and was more stable than the original latex.

Example 4

To 100 grams of ordinary ammonia latex, having a concentration of 36% solids, 5 parts of evaporated milk, having a concentration of 25% were added. The resultant latex had increased surface tension, less tendency to foam, higher viscosity (109 sec.; blank, 40 sec.) and was decidedly more stable.

Example 5

To 100 grams of centrifuged latex, containing 60% solids, 2 grams of powdered whole milk was added. The powdered milk was first dissolved in water. The resultant product was considerably thicker, more stable, had increased surface tension, and did not web.

Example 6

To 100 grams of creamed latex, containing 60% solids, 2 parts of sulphur, .5 part of heptaldehyde-aniline condensate and 10 parts of antimony pentasulphide were added. This was accomplished by the use of .2 part of ammonium laurate. To the thus compounded latex were added 20 ccs. of sweet cow's milk. The viscosity was considerably increased by this addition. Using the same pipette, the time required for the compound without the milk was 45 seconds and with the milk 85 seconds. This compound also did not "web".

Example 7

The following shows the acidification of latex by strong acids in the presence of milk.

To 100 grams of ammonia latex, 36% solids, 10 cc. of sweet milk were added. To this was then added formaldehyde sufficient to neutralize the ammonia. Subsequently 10% acetic acid was added until a pH of 5.5 was reached. The latex thus obtained remained stable and fluid over long periods of time—six months to one year.

Example 8

The effect of the addition of milk to increase the viscosity of normal and creamed latices is clearly shown in the following table:

|  | Viscosity |
|---|---|
|  | Seconds |
| Latex—33% total solids | 40 |
| Latex+5 parts sweet milk | 65 |
| Latex+10 parts sweet milk | 180 |
| Latex+5 parts buttermilk | 92 |
| Latex+10 parts buttermilk | 195 |
| Latex+5 parts evaporated milk | 109 |
| Latex+10 parts evaporated milk | 185 |
| Creamed latex, 55% total solids | 9 |
| Creamed latex+1.5% sweet milk | 112 |
| Creamed latex+1.5% evaporated milk | 256 |

The viscosities of the normal latex samples and creamed latex samples were measured using different capillaries. The various normal latex samples are properly comparative as are the various creamed latex samples, but the two groups may not be compared with each other.

Example 9

To illustrate the reduction in the tendency of the latex to foam, the following experiment is included:

100 ccs. of normal ammonia latex, containing 36% solids, were put in two separate 400 cc. beakers. To one 5 cc. of evaporated milk were added, and to the other 5 cc. of water. An air stream was then passed through each beaker at the same rate for thirty seconds. The time was taken when the surface of the liquid became smooth again, or when there ceased to be any foam or bubbles on the surface. In the case of the beaker containing the normal latex it required 12 minutes to bring this about, while in the case of the latex treated with milk the same had been accomplished in 40 seconds.

Example 10

The increase in the surface tension of latex is easily demonstrated by the following method:

One of the usual methods of measuring interfacial tension is to drop a certain immiscible solvent through the material, the interfacial tension of which is desired. In the case of latex a refined petroleum oil readily serves to differentiate between the surface tension of various latices. By using this method the following results were obtained: 5 cc. of petroleum oil were passed through the latex and the latex containing 5 cc. of evaporated milk per 100 cc. of latex. In both cases ammonia latex was used containing 36% solids. The drop number for the latex alone was 127, while the drop number for the latex plus milk was 62. Using the same capillary the drop number for water is 38.

By the process of this invention, I am able to prepare latices with greatly increased mechanical and colloidal stability, and thickened latices of various concentrations, even up to paste-like consistency. I am also able to reduce the foaming of latex compositions under the usual unavoidable agitation incident to its utilization in various commercial processes. Also, a new type of stabilizer for acid latex, one which may be used in the acidification of latex in its undiluted form and with strong acids, has been found.

Various other commercial applications of this invention will readily occur to persons skilled in the art, and while the invention has been described more or less in detail, it is not intended thereby to so limit it, inasmuch as the examples herein set forth are merely illustrative thereof and various modifications may be made without departing from the invention, the scope of which is indicated in the following claims:

Having thus described my invention, what I claim and desire to protect by Letters Patent is:

1. A method of acidifying latex comprising mixing milk with alkaline preserved latex and mixing with the treated latex an acidic material.

2. A method of acidifying latex comprising mixing with alkaline preserved latex a minor proportion of milk and acidifying the thus treated latex.

3. A method of acidifying latex comprising mixing milk with alkaline preserved latex and mixing with the treated latex a strong acid.

4. A method of acidifying latex comprising mixing milk with alkaline preserved latex and mixing with the thus treated latex acetic acid.

5. A method of acidifying ammonia preserved latex comprising mixing with the latex a minor proportion of milk and mixing with the thus treated latex formaldehyde to neutralize the alkalinity and acetic acid until the desired acidity is produced.

ALEXANDER A. NIKITIN.